June 16, 1964

W. S. RAYNOR 3,137,286

PALLET LOADING MACHINE

Filed April 14, 1958

INVENTOR

WARREN S. RAYNOR

BY *Ready, Browne, Schuyler & Beveridge*

ATTORNEYS

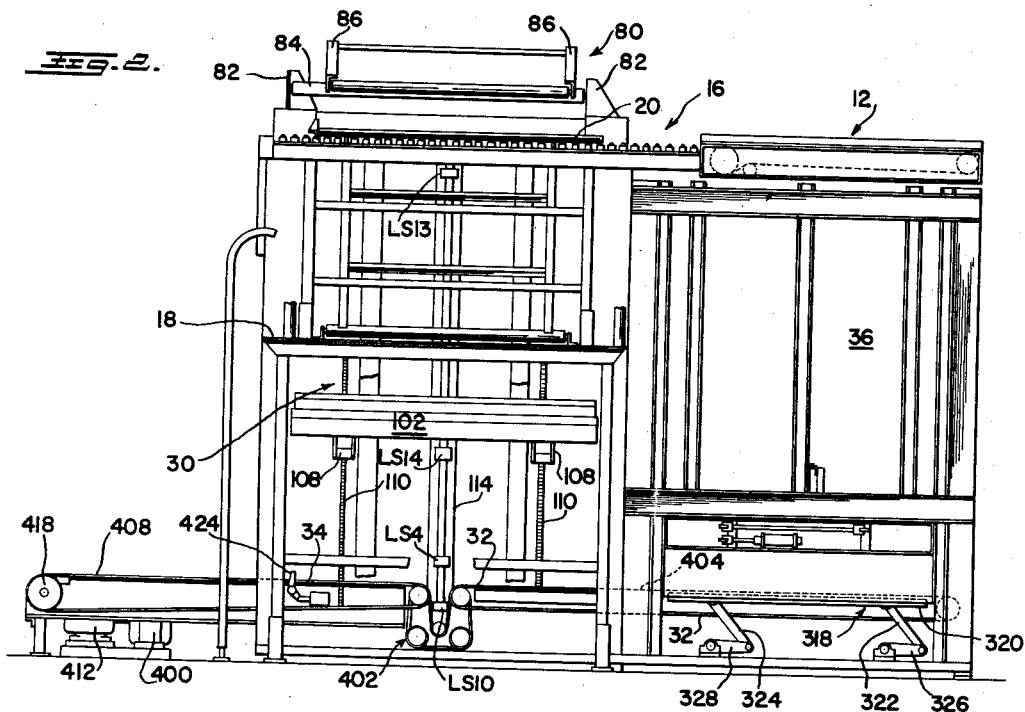
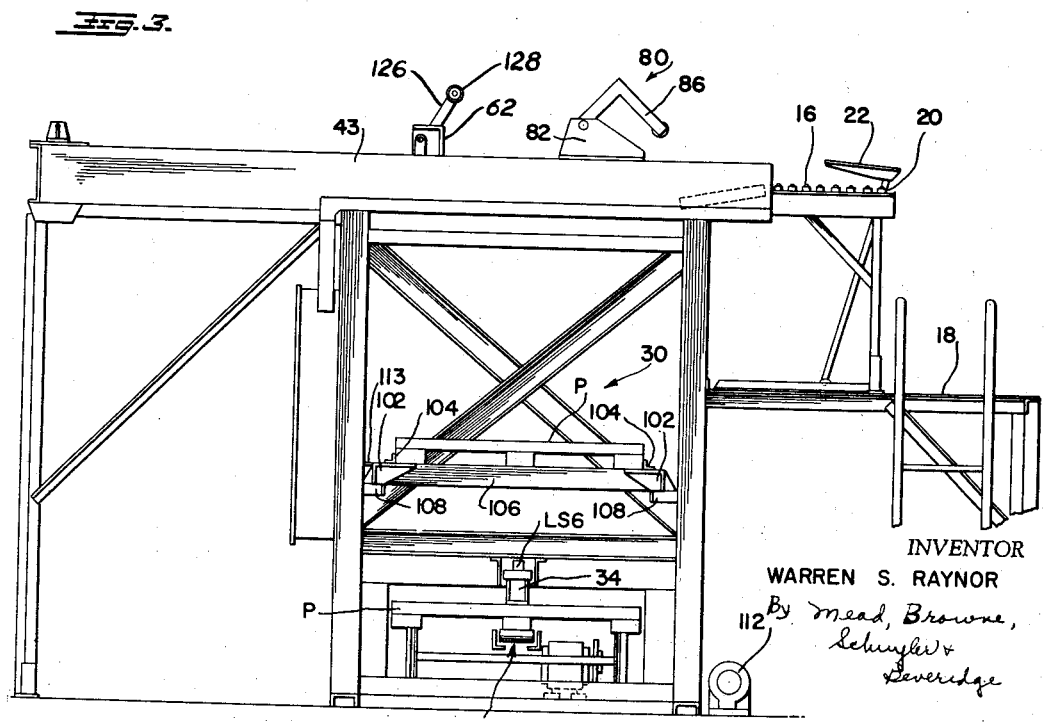

June 16, 1964  W. S. RAYNOR  3,137,286
PALLET LOADING MACHINE
Filed April 14, 1958  11 Sheets-Sheet 3
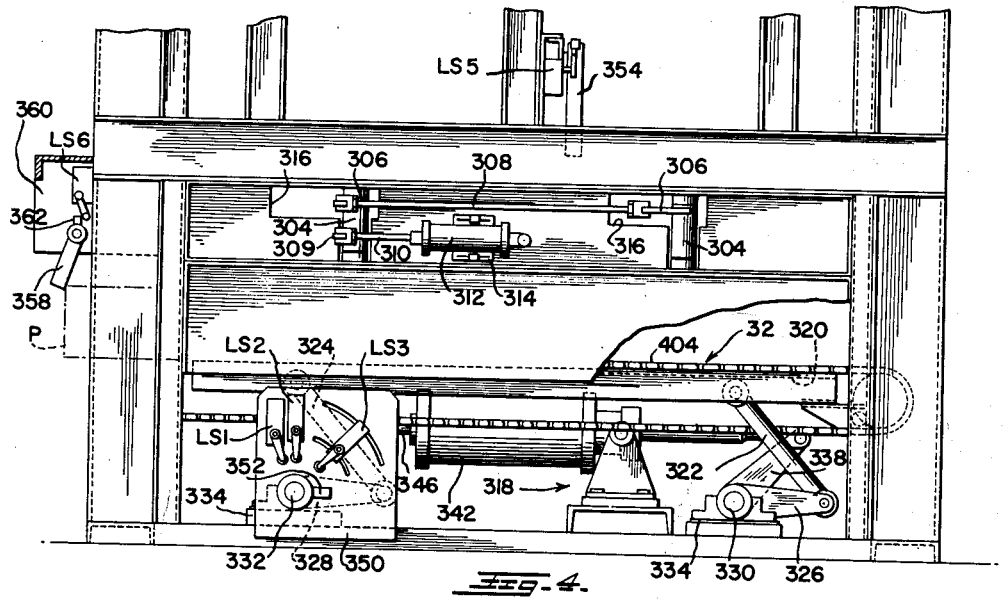
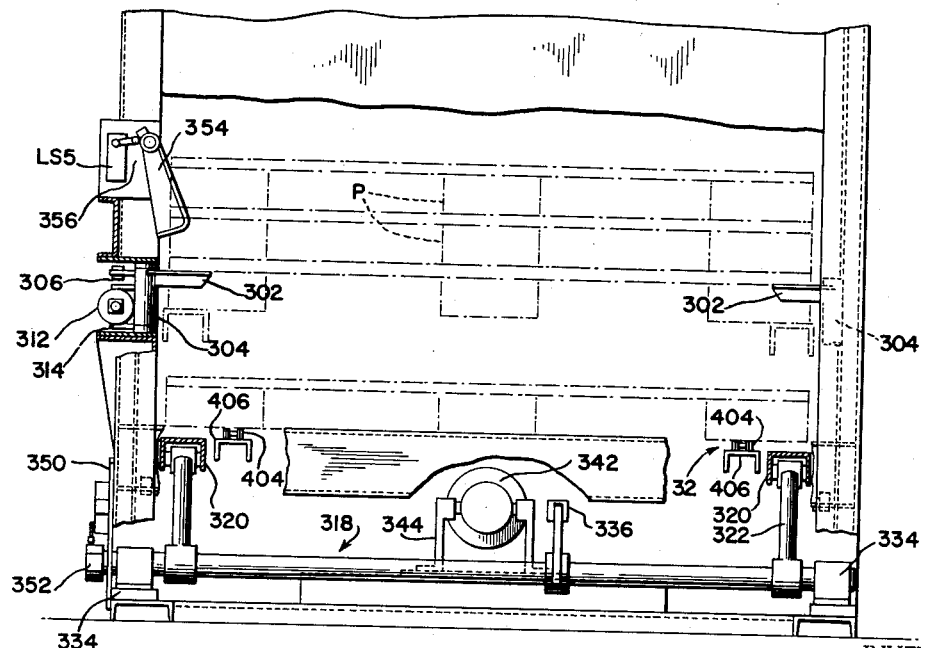
INVENTOR
WARREN S. RAYNOR
BY Mead, Browne, Schuyler & Beveridge
ATTORNEYS

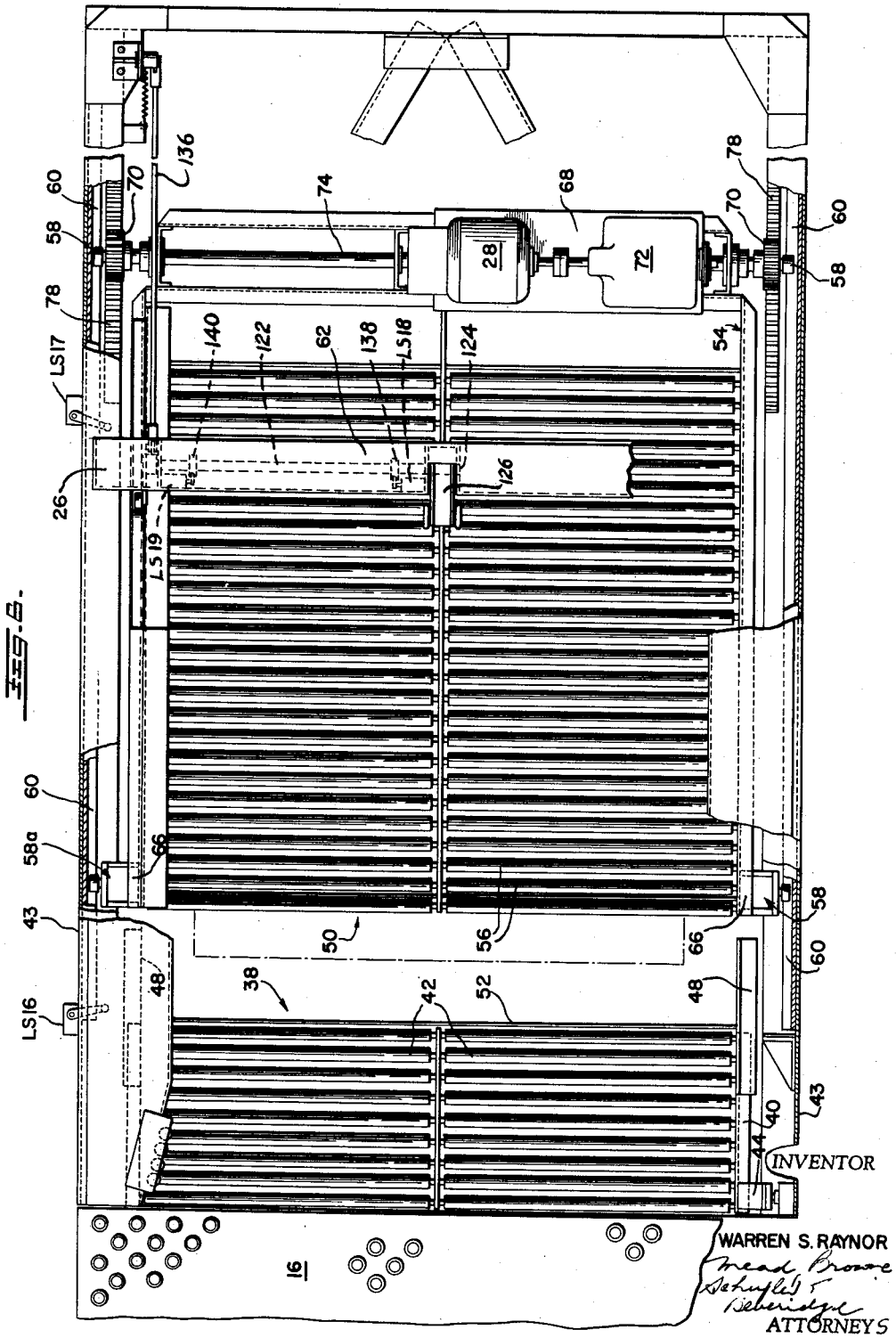

June 16, 1964 W. S. RAYNOR 3,137,286
PALLET LOADING MACHINE
Filed April 14, 1958 11 Sheets-Sheet 5
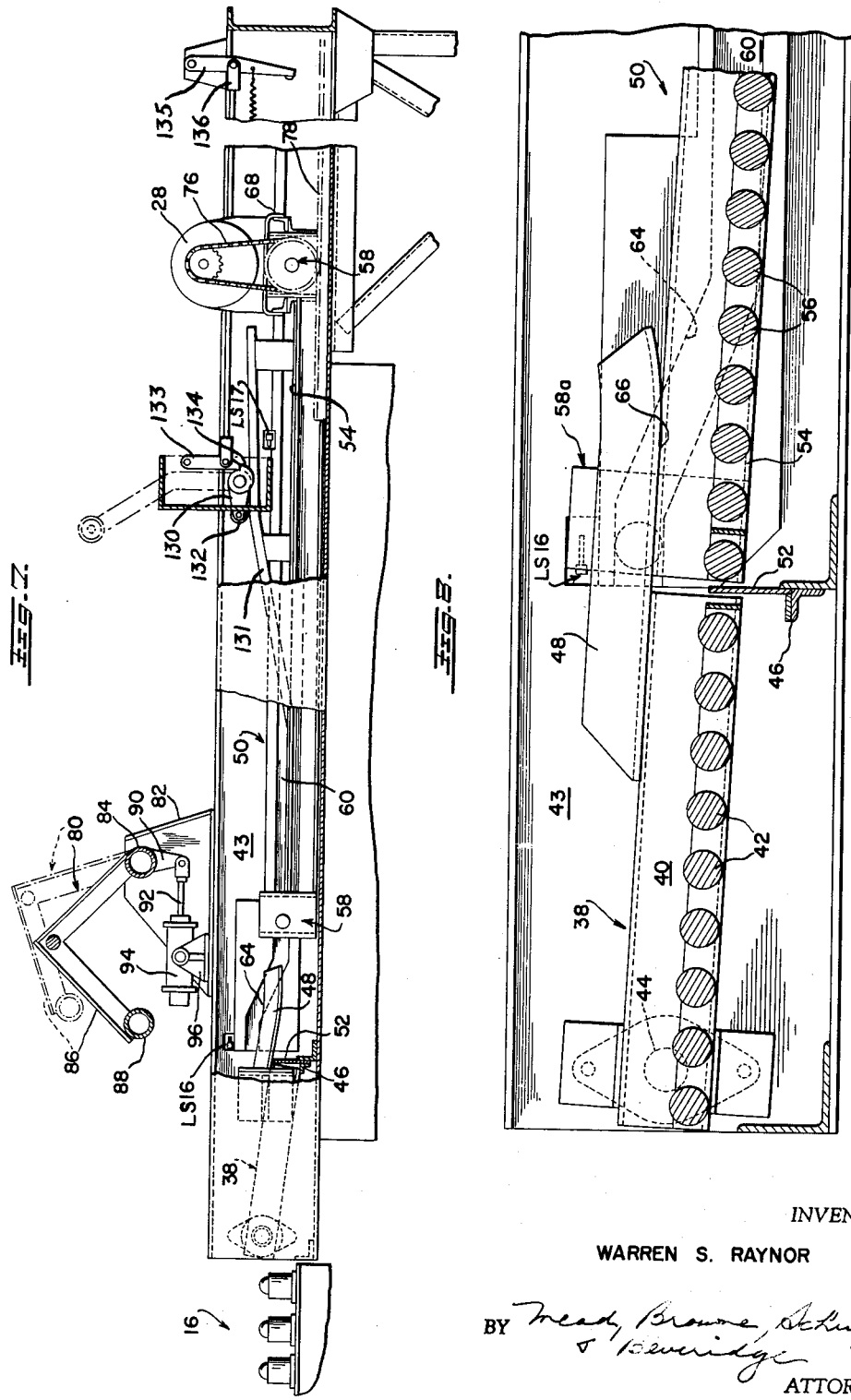
INVENTOR
WARREN S. RAYNOR
BY
ATTORNEYS

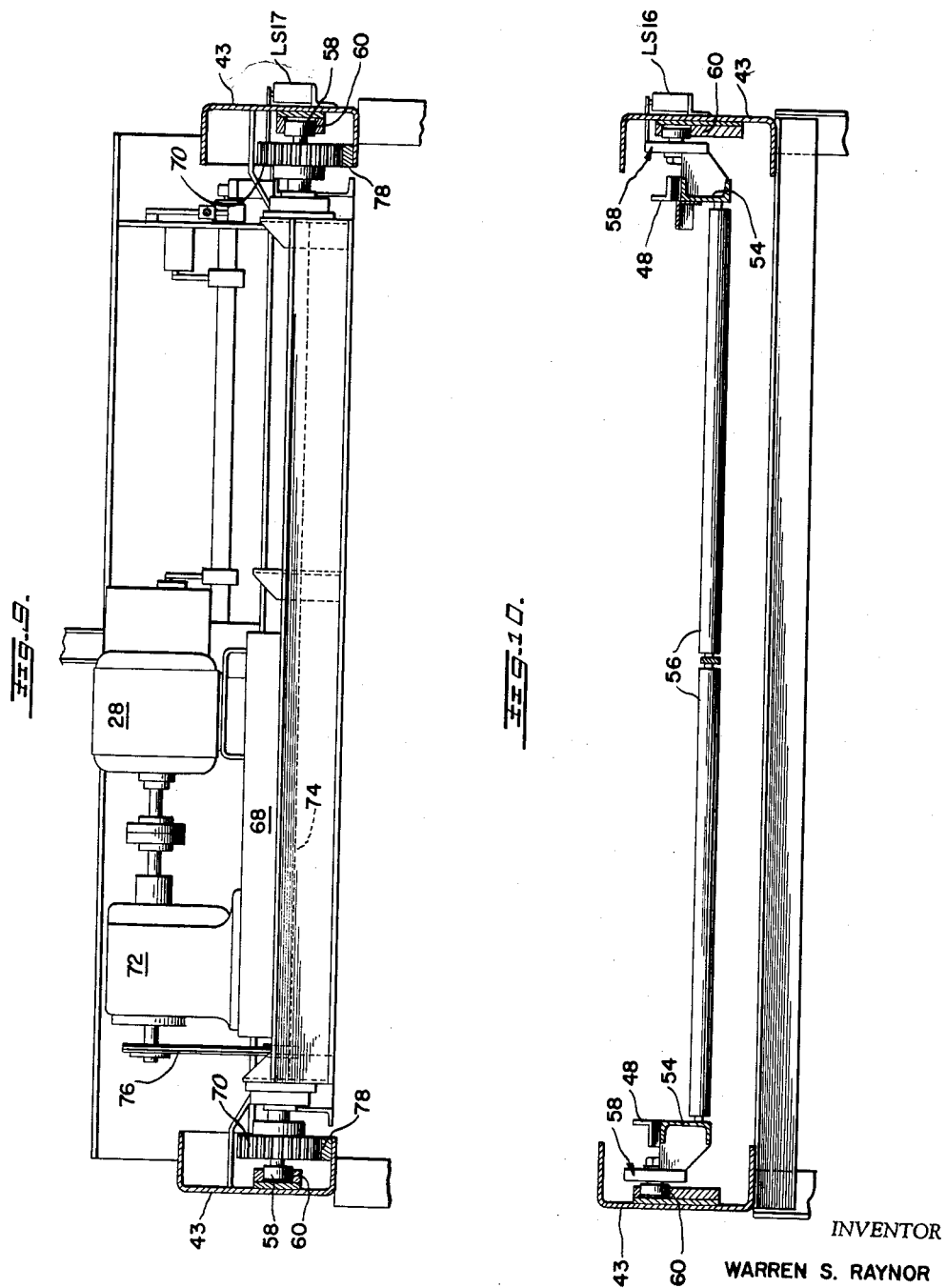

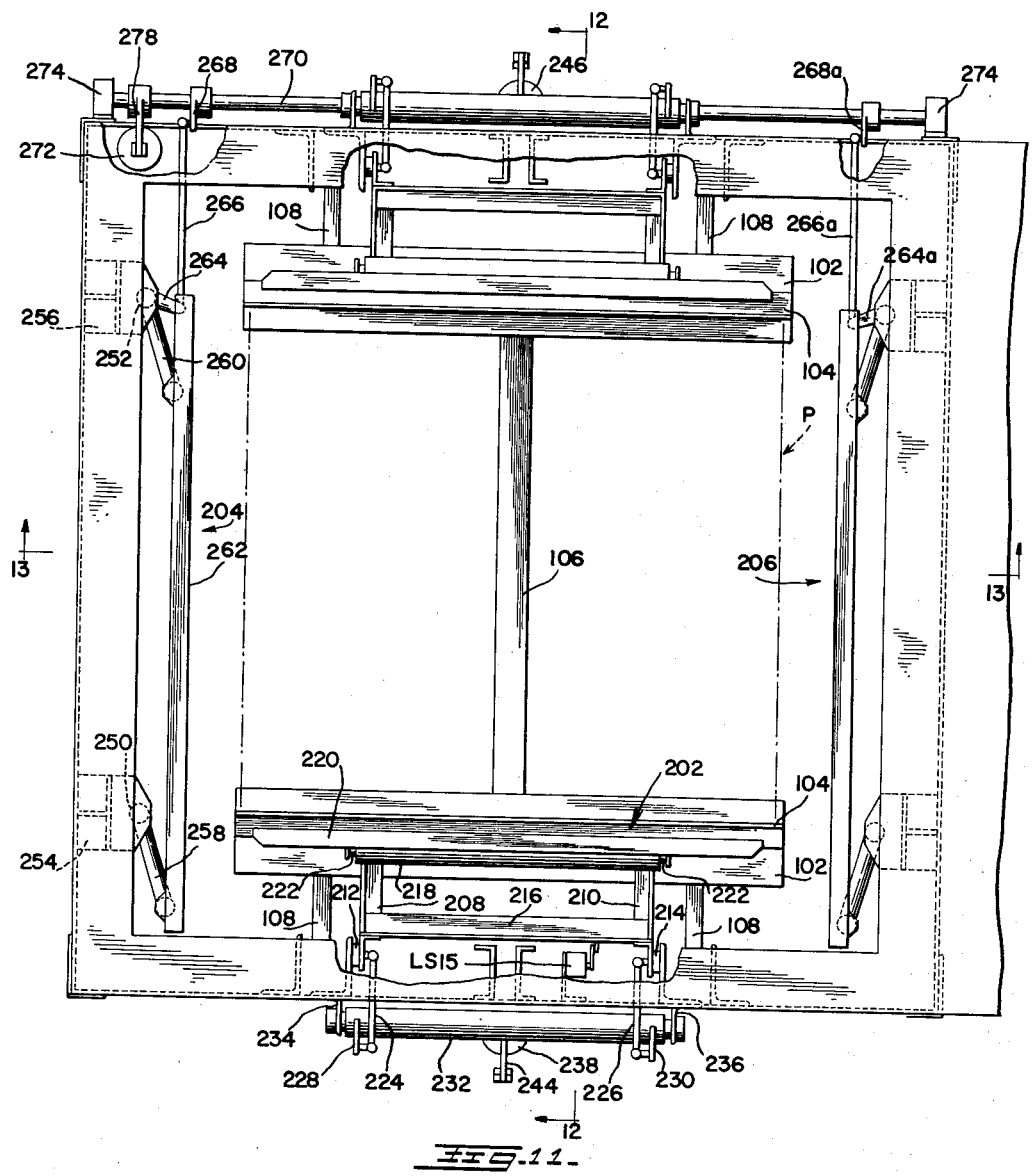

June 16, 1964

W. S. RAYNOR 3,137,286

PALLET LOADING MACHINE

Filed April 14, 1958

INVENTOR
WARREN S. RAYNOR

BY Mead, Browne, Schuyler & Beveridge

ATTORNEYS

June 16, 1964
W. S. RAYNOR
3,137,286
PALLET LOADING MACHINE
Filed April 14, 1958
11 Sheets-Sheet 9
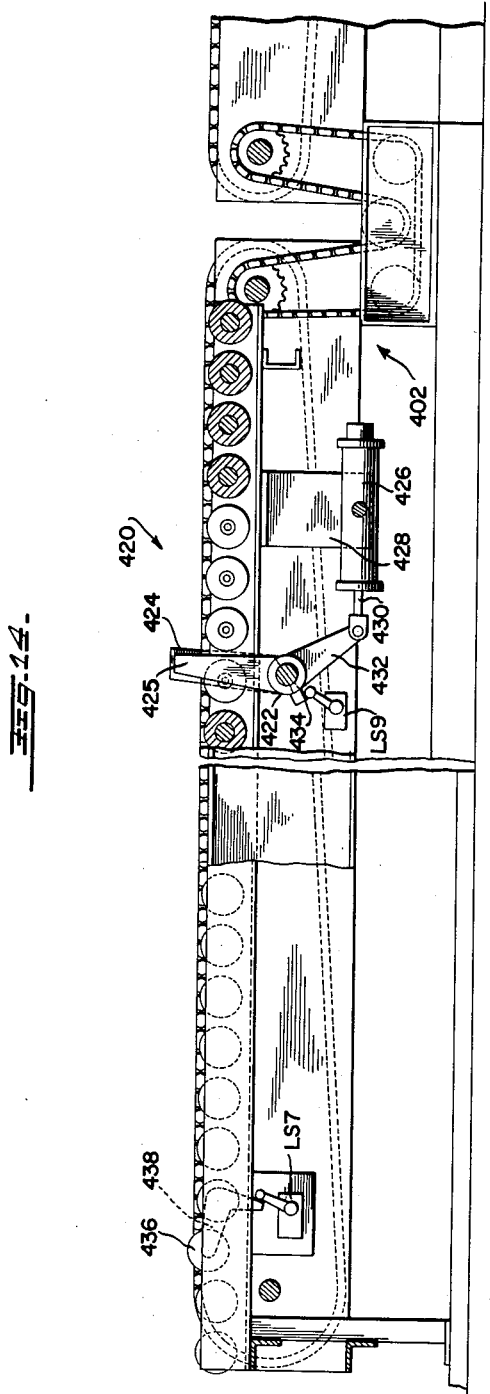
INVENTOR
WARREN S. RAYNOR
BY
ATTORNEYS June 16, 1964 W. S. RAYNOR 3,137,286
PALLET LOADING MACHINE
Filed April 14, 1958 11 Sheets-Sheet 10

INVENTOR
WARREN S. RAYNOR

BY Mead, Browne, Schuyler & Beveridge
ATTORNEYS

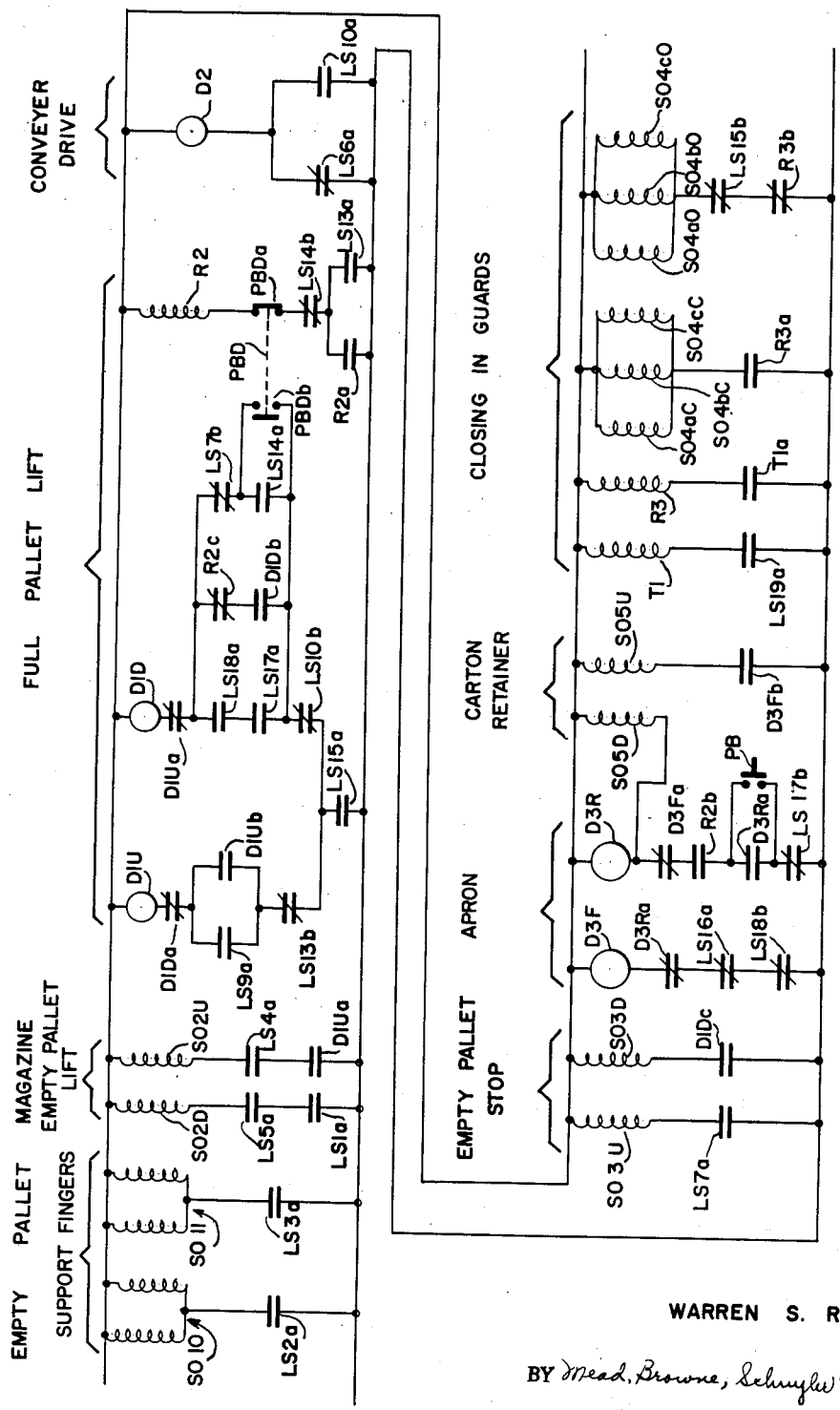

United States Patent Office 3,137,286
Patented June 16, 1964

3,137,286
PALLET LOADING MACHINE
Warren S. Raynor, Port Hope, Ontario, Canada, assignor to Mathews Conveyer Company, Ellwood City, Pa., a corporation of Pennsylvania
Filed Apr. 14, 1958, Ser. No. 728,243
15 Claims. (Cl. 214—6)

This invention relates to pallet loading machines for assembling articles from a conveyer line into unit loads upon a pallet for convenient handling as by a fork lift truck.

The general function of a pallet loading machine is to receive a stream of articles, usually in single line from a conveyor, and to discharge fully loaded pallets upon which the received articles are assembled in stacked layers. In the usual case, such machines will receive articles from a conveyor, assemble the articles into rows and arrange the rows into layers, position a pallet to receive a layer, transfer the layers to the pallet, and discharge the fully loaded pallet. Conventionally, empty pallets are automatically supplied to the machine as needed.

One primary object of my invention is to provide an improved structural assembly for facilitating the assembly of rows of articles into layers and for transferring the assembled layers on to the pallet.

Another primary object of my invention is to provide an improved pallet handling mechanism which supplies empty pallets to the lift in an extremely efficient fashion.

Another object of my invention is to retain all articles of a layer in position when the apron is retracted to deposit the layer on a pallet.

Still another object of my invention is to reduce the time involved in substituting an empty pallet for a loaded pallet by providing a "ready" position immediately adjacent the pallet lift at which an empty pallet may be located while awaiting its introduction into the pallet lift.

Still another object of my invention is to provide improved apparatus for transferring empty pallets from a magazine to the aforementioned "ready" position.

Still another object of my invention is to provide an improved assembly for compacting articles within layers after they are transferred to the lift to thereby achieve a more stable unit load upon the pallet.

The foregoing, and other objects, are achieved in a pallet loading machine wherein an apron is mounted for reciprocating movement upon a pair of spaced tracks extending along two opposed sides of the upper end of the pallet lift. At the forward end of the tracks, that is, the end at which articles are moved on to the apron, the tracks are inclined upwardly so that the apron, when in its forwardmost position, presents an inclined surface to the articles to allow the articles to flow by gravity toward the opposite or rearwardmost end of the apron.

Articles are assembled into rows prior to their transfer to the apron, the row assembly operation being performed at what might be termed an article assembly station. Extending from the forward edge of the apron is a pivoted accumulation table which, when the apron is in its forwardmost or article receiving position, is likewise inclined so that the article supporting surface of the accumulation table forms a continuation of the inclined article supporting surface of the apron. Upon retraction of the apron to strip the articles on to the waiting pallet lift, the accumulation table is permitted to pivot downwardly to a position wherein a stationary stop engages articles on the supporting surface of the table. As the apron returns to its forward or article receiving position, it engages the accumulation table and pivots the table upwardly a sufficient amount to locate the article supporting surface of the table above the stop, thereby allowing any articles which may have been placed upon the table during the retraction of the apron to immediately flow on to the apron.

A carbon retaining device, associated with the apron assembly, is operable to prevent cartons from toppling off the forward edge of the apron by the inertia forces occasioned during the initial portions of the apron retracting movement. The carton retaining device is normally maintained in a position clear of articles entering the conveyer, but is controlled by the apron to move into its carton retaining position upon actuation of the apron retracting control circuit.

A set of retractable closing in guides around the sides of the pallet lift immediately below the apron are controlled to move simultaneously into the pallet lift shaft to engage articles located upon the pallet and to compact the articles into a stable load. Safety interlocks prevent movement of the pallet lift during the compacting operation.

When a fully loaded pallet is lowered by the lift, a transfer conveyor is driven to transfer the loaded pallet from the lift to a discharge station and simultaneously transfer an empty pallet from a "ready" position intermediate the empty pallet magazine and the lift into position upon the lift. Arrival of the empty pallet in position over the lift causes the lift to raise. Upon upward movement of the lift, an empty pallet is extracted from an empty pallet magazine and placed upon the conveyer by which it is driven toward the lift. Upon arrival of the pallet at the "ready" position at the entrance to the pallet lift the conveyor is stopped.

Furthere objects and features of my invention will become readily apparent by reference to the following specification taken in conjunction with the accompanying drawings.

In the drawings:

FIG. 2 is a front view of the machine shown in FIG. 1 with certain parts removed and other parts broken away to show certain details of my invention.

FIG. 3 is an end view of the machine shown in FIG. 1.

FIG. 4 is an enlarged detailed view of the lower portion of the empty pallet magazine taken from the same direction as FIG. 2 and showing certain parts omitted from FIG. 2.

FIG. 5 is a detailed end view of that portion of the empty pallet magazine shown in FIG. 4.

FIG. 6 is a detailed plan view of the apron assembly of the machine of FIG. 1 showing the apron partially retracted.

FIG. 7 is a side view of the apron assembly with the parts oriented in the same position as in FIG. 6, certain of the parts being broken away or shown in section.

FIG. 8 is a partial cross-sectional view of the apron assembly showing the apron in its normal or forwardmost position.

FIG. 9 is a vertical cross-sectional view taken behind the motor assembly of the apron of FIG. 6.

FIG. 10 is a vertical cross-sectional view of the apron of FIG. 6 taken at a point intermediate the ends of the apron.

FIG. 11 is a plan view of the upper end of the full pallet lift showing the lift platform and closing in guards.

FIG. 14 is a side view, partially in section, of the full pallet discharge conveyer.

FIG. 15 is a schematic diagram of the pneumatic control system.

FIG. 16 is a schematic drawing of the electrical control circuit.

General Description

Figure 1:
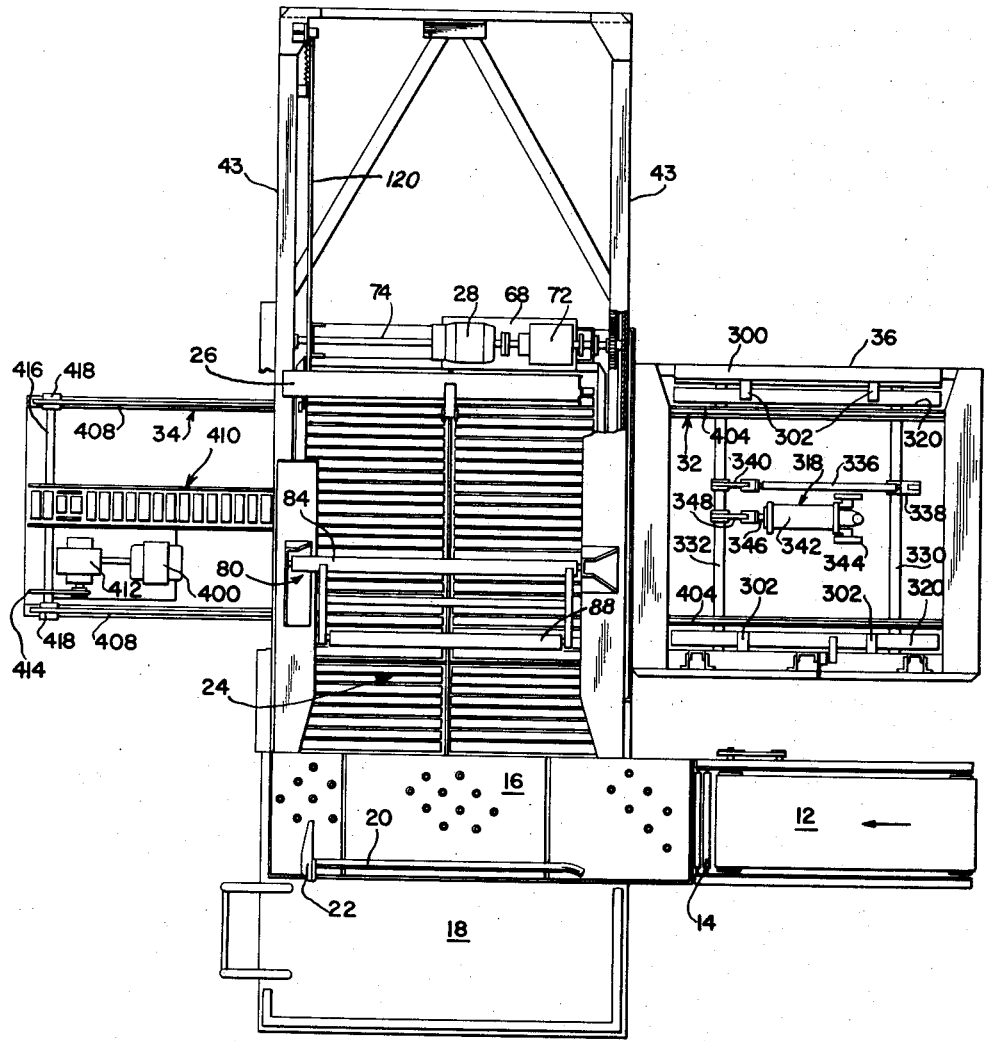
FIG. 1 is a plan view of a pallet loading machine embodying my invention.

The overall arrangement of a machine embodying my invention may be best appreciated by reference to FIGS. 1, 2 and 3 of the drawings. Cartons or articles to be loaded upon a pallet are fed into the machine upon infeed conveyer 12, which in the disclosed embodiment is a power-driven belt conveyer of more or less conventional design. Conveyer 12 is provided with suitable means for regulating the rate at which articles are discharged therefrom, one exemplary means being an article stop 14 located at the discharge end of conveyer 12, stop 14 being provided with manually operable control means (not shown) whereby the machine operator may regulate the flow of articles from conveyer 12 as desired. Assuming stop 14 is in its lowered position, articles pass from infeed conveyer 12 on to an article assembly station in the form of a ball transfer table 16 upon which the articles may be arranged in various patterns by the machine operator who works on platform 18. To assist the operator in forming the articles into rows of various arrangements, a manually operable article transfer device or pusher 20 is mounted for movement transversely across the upper surface of table 16. Pusher 20 is provided with a carton locating arm 22 which assists the operator in aligning rows of articles with the inlet portion of apron assembly 24.

After one or more rows of articles have been arranged against pusher 20, the assembled group of articles is manually transferred from table 16 on to apron assembly 24 by operation of pusher 20. The transferred articles roll down the inclined article supporting surface of apron assembly 24 until they engage a stationary stripper bar 26. Subsequent groups of articles are assembled and transferred to apron assembly 24 until sufficient groups of articles have been accumulated upon apron 24 to form a layer upon the pallet. At this time, the operator energizes the apron drive motor 28 to retract the apron from beneath the articles, allowing the layer of articles to drop on to a pallet which is supported immediately beneath the apron by pallet lift 30. The pallet lift is then actuated to automatically lower until the upper surfaces of the articles upon the pallet occupy the position previously occupied by the article supporting surface of the pallet.

At this time, the lift is stopped and closing in guides arranged around the sides of the pallet lift are actuated to align and compact the layer of articles upon the pallet. Apron 24 is automatically returned to its previous position overlying the lift shaft and further layers of articles are transferred to the pallet in a similar manner. Upon the transfer of each layer of articles to the pallet, the pallet lift is automatically lowered step by step. When the pallet is fully loaded, the lift control means operates to lower the lift to the bottom of the pallet lift shaft. A power driven conveyer having a transfer section 32 and a discharge section 34 extends transversely through the bottom of the pallet lift shaft and engages the lowered pallet just prior to the time at which the lift reaches the bottom of is descent. As the lift is lowered below the conveyer, the loaded pallet is supported by the conveying chains and is driven out along the discharge section clear of the pallet lift. Simultaneously with the discharge of the loaded pallet from the lift, an empty pallet is transferred into position within the lift shaft from an empty pallet magazine 36. The control system then operates to automatically raise the lift to bring the empty pallet upwardly into an article receiving position immediately below apron assembly 24, thereby conditioning the machine to repeat the foregoing cycle.

Apron Assembly

The structural details of apron assembly 24 may be best appreciated by reference to FIGS. 6 through 10 inclusive. The article supporting surface of apron assembly 24 is divided into two sections. The first of these sections is what may be referred to as an accumulation table 38 which includes a rigid frame 40 within which are rotatably supported a plurality of elongated rollers 42, rollers 42 defining the article supporting surface of the accumulation table 38. Frame 40 is pivotally supported between spaced side frame members 43 by journal assemblies 44 located adjacent the edge of transfer table 16. Journal assemblies 44 define a pivotal axis for frame 40 which extends generally along the forward edge of table 38, i.e., that edge of table 38 adjacent transfer table 16. A fixed stop 46 is mounted on each of side frame members 43 to limit (FIG. 7) downward pivotal movement of table 38 about journal assemblies 44. Affixed, as by welding, to each side of frame 40 is a rearwardly projecting arm 48 which is located to engage the movable apron portion 50 of apron assembly 24 when the movable apron 50 is moved into the position shown in FIG. 8. Engagement of arms 48 with apron 50 elevates accumulation table 38 upwardly from the FIG. 7 position to the FIG. 8 position.

A fixed stop plate 52 projects upwardly between side frame members 43 along the rear edge of accumulation table 38. As best seen in FIG. 8, when accumulation table is in its upper position, stop 52 is disposed below the article supporting surface defined by rollers 42, thereby permitting passage of articles from table 38 to apron 50. When table 38 assumes its lower position shown in FIG. 7, stop member 52 projects upwardly above the rearwardmost rollers 42 to prevent articles from passing beyond the rearward edge of accumulation table 38.

The movable portion or apron 50 of apron assembly 24 includes a rigid frame designated generally at 54 within which are rotatably supported a plurality of rollers 56 which define the article supporting surface of apron 50. Apron 50 is supported for movement upon side frame member 43 by roller wheel assemblies 58, 58a which ride along fixed track sections 60 mounted on each of side frame members 43. Track sections 60 permit movement of apron 50 from the position shown in FIG. 8, wherein the front edge of the apron is located adjacent the rear edge of accumulation table 38, to a position wherein the front edge of apron 50 is retracted beyond fixed stripper bar 26 which is mounted between side frame members 43 to extend across apron 50 above the article supporting surface thereof.

As best seen in FIGS. 7 and 8, the forward portion of each track section 60 is provided with an upwardly inclined section 64 which causes the forward edge of apron 50 to be elevated as it approaches accumulation table 38. As apron 50 moves from the FIG. 7 position to the position shown in FIG. 8, the rightwardmost ends of arms 48 on accumulation table 38 engage the upper surface of apron frame 54 at 66, thereby elevating accumulation table 38 to the FIG. 8 position as the front edge of apron 50 is driven up inclined track sections 64.

Apron 50 is driven by drive motor 28 which is supported upon a motor mount 68 rigidly attached to the rear edge of apron frame 54. Motor 28 is a conventional reversible motor and is coupled to pinion gears 70 through a suitable gearbox 72 which is connected to drive pinion shaft 74 by a chain and sprocket connection 76. Pinions 70 are meshed with stationary racks 78 fixed to the respective side members 43 of the machine frame. Limit switches LS16 and LS17 are mounted upon one of side frame members 43 and are provided with strikers which project through the side frame member into track section 60. LS16 is located so that its striker is engaged by front wheel assembly 58a when apron 50 is in its forwardmost position (FIG. 8) while LS17 is located so that its striker is engaged by assembly 58a when the apron is in its fully retracted position.

As best appreciated from FIG. 8, when apron 50 is in its forwardmost position, the article supporting surfaces of accumulation table 38 and apron 50 (defined respectively by rollers 42 and 56) define a continuous surface which is inclined downwardly in the direction away from transfer table 16. When apron 50 is in the FIG. 8 position, apron 50 overlies the upper end of the pallet lift shaft and hence when a layer of articles is accumulated upon apron 50 articles may be located closely adjacent the forward edge of apron 50. As the apron begins its retracting movement, the inertia of articles located on the apron tends to topple the articles adjacent the forward edge of the apron backwards and in extreme cases causes articles to fall backward over the retracting front edge of apron 50. This inertia effect is further augmented by movement of the apron down the inclined portion 64 of track 60 during the initial phases of the retracting movement of apron 50. To prevent this circumstance, a carton retaining device 80 is mounted upon the machine frame adjacent the rear edge of accumulation table 38.

Carton retaining device 80 is pivotally supported upon side frame members 43 by fixed upstanding lugs 82 within which a pivot shaft 84 is journalled for controlled rotation. A pair of L-shaped side frame members 86 are rigidly secured to shaft 84 and are joined at their opposite ends by an article engaging cross-bar 88 which extends transversely across the space between side members 43. A crank arm 90 is fixed to shaft 84 and is coupled to piston rod 92 of reversible pneumatic motor 94 pivotally mounted on lugs 82 as by frame members 96.

Carton retaining assembly 80 is normally maintained in the phantom line position of FIG. 7 by energizing motor 94 to move its piston to the extreme leftward limit of movement. Reversal of the supply connections to motor 94 pivots carton retaining assembly 80 downwardly to the full line position of FIG. 7, thus disposing cross-bar 84 in a position to prevent cartons from toppling off apron 50 during the initial portion of the retracting movement of the apron.

Full Pallet Lift

As best seen in FIGS. 2 and 3, full pallet lift 30 operates within a lift shaft extending downwardly beneath the forwardmost position of movable apron 50. Lift 30 includes a lift platform of generally H-shaped appearance when viewed from above. The side frame members 102 of the lift platform are of generally angle-shaped configuration and extend entirely across the front and rear sides of the pallet lift shaft. Guide members 104 are secured upon the upper surface of side frame members 102 to locate the pallet P on the lift platform. A single rigid cross member 106 interconnects the respective side members 102. At spaced locations on each of side members 102 a coupling assembly 108 connects the lift platform to lift chains 110 which are driven to raise or lower the lift by a reversible lift motor 112 coupled to simultaneously drive each of the four sets of chains 110. Actuation of motor 112 will raise or lower the lift platform between a lower limit wherein the pallet supporting surfaces of side members 102 are disposed below the conveying surfaces of conveyor sections 34 and 32 and an upper limit immediately below apron 50. At the lower limit, cross member 106 passes downwardly between the adjacent ends of conveying sections 32 and 34 to permit a pallet supported upon the lift to be transferred to the conveying surface by the lowering action of the lift. A limit switch operating arm 113 is mounted on the rear side frame member 102 in a position to engage the strikers of various limit switches mounted at different levels on full lift duct 114. Four limit switches are mounted upon duct 114 and their respective locations may be best appreciated from FIG. 2. The lowermost of the limit switches is designated LS10 and serves to detect the arrival of the pallet lift at its lower limit. LS4 detects the initial upward movement of the lift away from the lower limit. LS14 is located to be contacted by arm 113 when the pallet on the lift is fully loaded. LS13 is located at the top of duct 114 and detects the arrival of the pallet lift at its upper limit.

Full Lift Control

As stated above, articles are transferred from apron 50 to the pallet on the full pallet lift by retracting the apron from beneath the articles so that articles are stripped from the surface of the apron by stripper bar 26 to drop downwardly on to the pallet. The pallet, when waiting receipt of the first layer, is disposed immediately below the apron. Full retraction of the apron is utilized in the full pallet lift control circuit to initiate lowering of the lift. To halt lowering of the lift when the last transferred layer of articles reaches a position where its upper surface occupies the level previously occupied by the pallet (or next previously transferred layer), a full lift drop control device 120 is mounted upon one of side frame members 43 adjacent the side of apron 50.

As illustrated in FIGS. 1, 3, 6 and 7, a shaft 122 is journaled for rotation about a horizontal axis behind stripper bar 26. Fixed to the central portion of the shaft 122 and extending through an aperture 124 in the stripper bar is a lift control arm 126 carrying an article engaging roller 128. To shift the lift control arm 126 to and from an operative position disposed over the lift, a tracking arm 130 on one end of shaft 122 engages cam track 131 disposed at one side of the apron frame 54 and movable with the apron. As apron 50 is retracted from its position overlying the shaft, cam track 131 is withdrawn from engagement with roller 132, but tracking arm 130 is retained in its inoperative position by a pivoted keeper arm 133 which engages latch abutment 134 on the shaft 122. When the apron is retracted to its rearmost position where its rear edge engages the free end of a latch control arm 135 pivoted to the frame and connected by a rod 136 to the latch keeper 133. As is apparent in FIGS. 3 and 7, this engagement of apron 50 with latch control arm 135 removes keeper 133 from engagement with latch abutment 134 and releases control arm 126 to drop by gravity until its roller 128 engages the top of a carton on the pallet. In this way rotation of shaft 122 is controlled so it moves a switch operating cam 138 to energize lift motor 112 when the apron is retracted and the lift control latch is released.

Cam 138 is so designed that limit switch LS18 remains in position to energize motor 112 until the level of the cartons on the pallet is lowered to a position immediately beneath the apron 50. Then, the motor is stopped and downward movement of the lift is arrested. As the apron returns to its position overlying the pallet, cam 131 engages follower 132 to rotate lift control arm 126 to its inoperative position where keeper 133 again engages latch 134. A cam 140 on shaft 122 engages a limit switch LS19 when apron 50 is fully retracted to initiate action of the closing in guide assembly.

Closing in Guide Assembly

Figure 12:
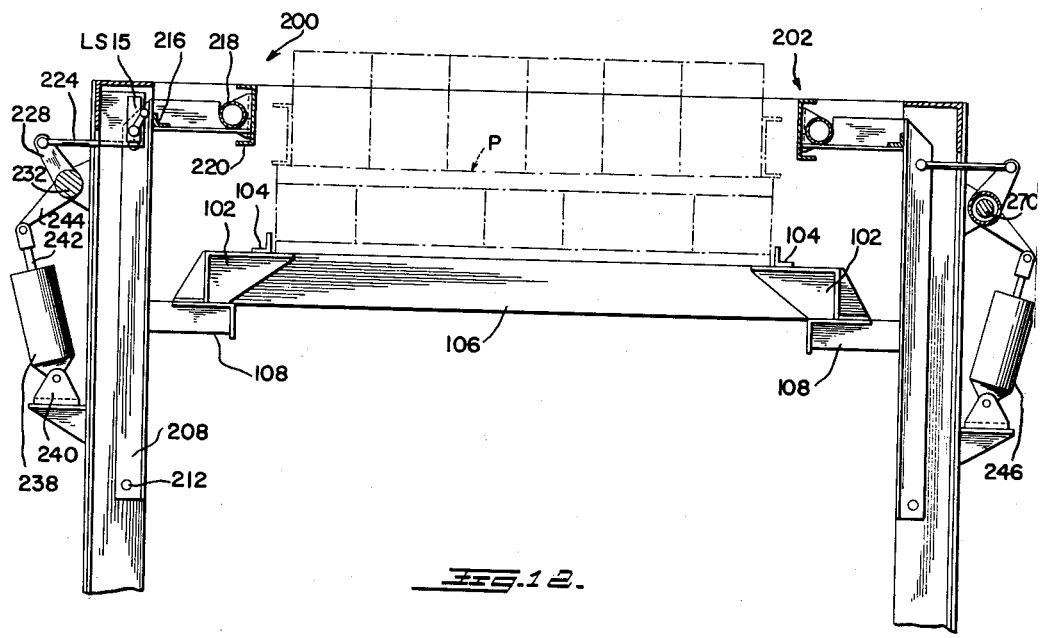
FIG. 12 is a partial vertical cross-sectional view through the full pallet lift taken on line 12—12 of FIG. 11.
Figure 13:
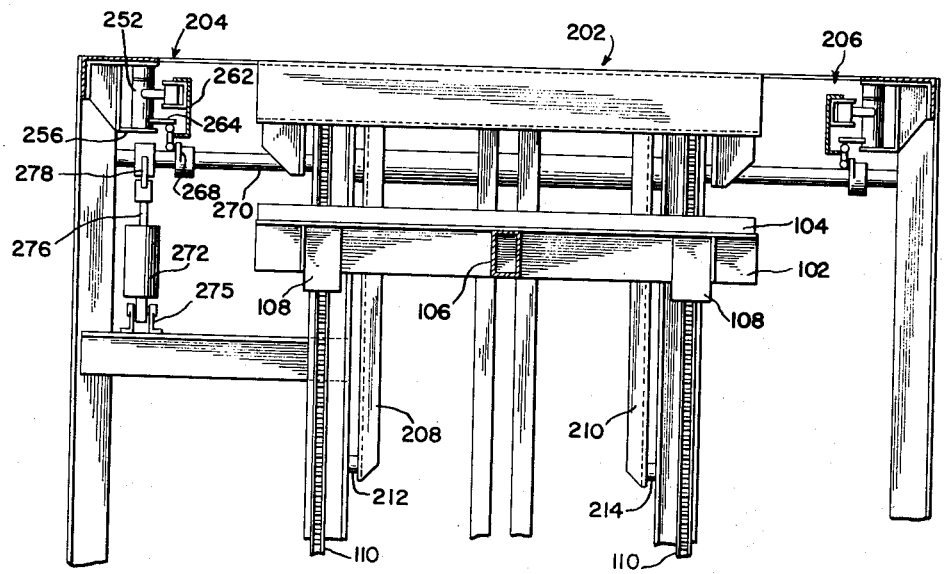
FIG. 13 is a vertical cross-sectional view of the upper section of the full pallet lift taken on line 13—13 of FIG. 11.
Figure 18:
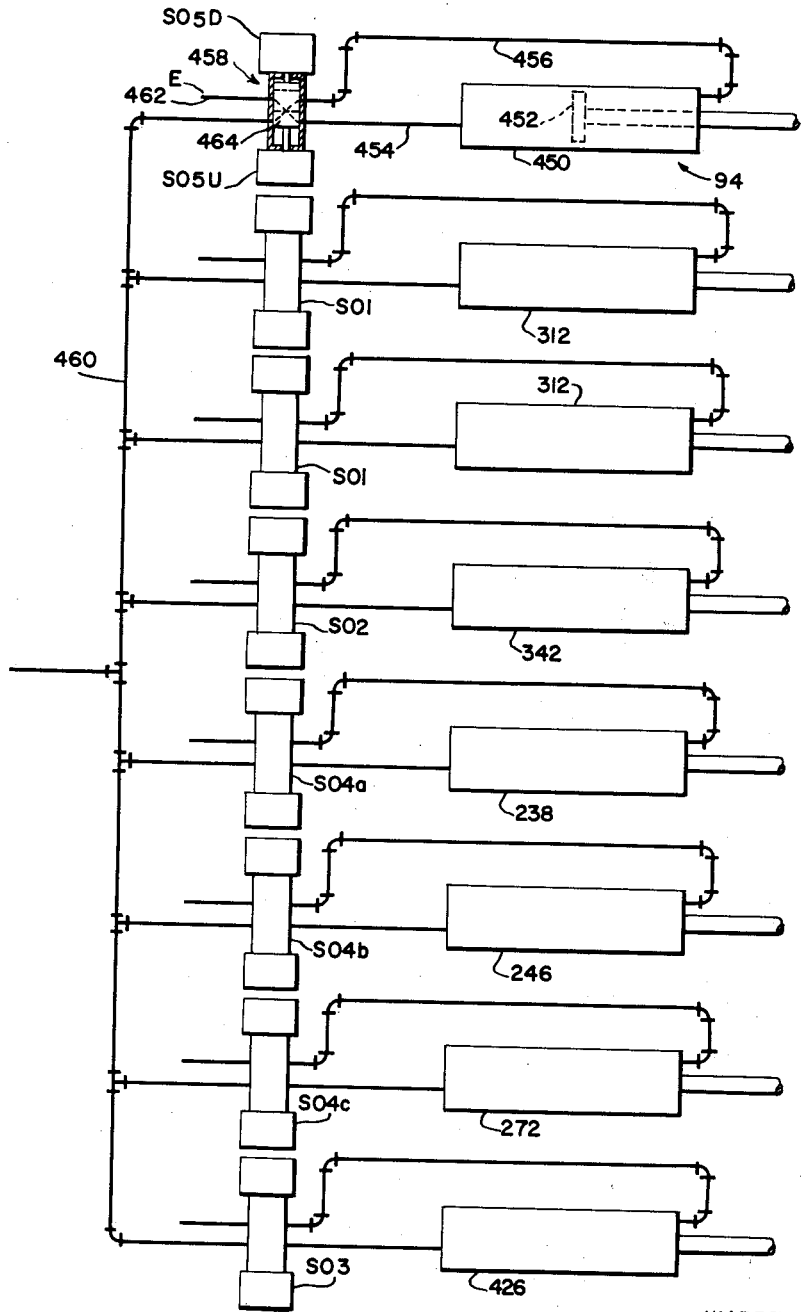

A closing in guide assembly, best shown in FIGS. 11 through 13 is located within the pallet lift shaft immediately below apron 50 to compact articles in position upon the pallet. The closing in guide assembly includes front and rear closing in guides 200, 202 respectively and side closing in guides 204, 206.

Front and rear closing in guides 200 and 202 are identical, and the following description of the structure of front closing in guide 200 is equally applicable to the structure of rear closing in guide 202. Front closing in guide 200 includes a pair of horizontally spaced L-shaped side members 208, 210 which are pivotally supported at their lower ends upon the machine frame by studs 212, 214. Side members 208 and 210 are rigidly connected at their upper ends by cross members 216 and 218. A carton engaging plate 220 is pivotally supported in front of cross frame member 218 as by studs 222 which couple plate 220 to cross member 218.

Actuating links 224 and 226 are pivotally connected respectively to side frame members 208 and 210 adjacent the upper end of the side frame members to couple the closing in guide frame to crank arms 228 and 230. Cranks 228 and 230 are fixed to a rotatable actuating shaft 232 journaled for rotation upon the machine frame at 234, 236. Shaft 232 is rotated by a reversible pneumatic motor 238 which is pivotally supported at one end upon the machine frame as at 240. The piston rod 242 of motor 238 is pivotally connected to crank 244 which is fixed to shaft 232. A separate motor 246 is pivoted to actuate rear closing in guide 202.

In FIG. 12, the front and rear closing in guides are shown in their retracted position. Application of pneumatic pressure to motors 238 and 246 moves the piston rods of the respective motors upwardly to drive the closing in guides to the dotted line position of FIG. 12, thereby compacting the layer of cartons disposed on pallet P.

Actuation of all closing in guides is initiated by limit switch LS19 of the full lift drop control assembly. An additional limit switch LS15 is mounted upon the machine frame at a location where its striker may be engaged by front closing in guide 200 when guide 200 is in its retracted position. LS15 is employed in the closing in guide retracting control circuit and further serves as a safety interlock to prevent operation of the lift unless all closing in guides are in their retracted position.

Side closing in guides 204 and 206 are identical to each other and the following description of guide 204 is equally applicable to guide 206. Guide 204 is supported upon the machine frame from a pair of spaced vertical pivot pins 250, 252 which are journaled for rotation about vertical axes in ears 254, 256 respectively. Crank arms 258, 260 are respectively fixed to pivot pins 250 and 252 and are pivotally coupled at their outer ends to article engaging pusher plate 262. The foregoing arrangement may be considered a parallel link system wherein plate 262 is maintained in parallel relationship at all times to the "stationary link" defined by the machine frame connection between pivot pins 250 and 252.

An operating crank 264 is rigidly connected to pin 252 and is coupled by a pivoted link member 266 to crank 268 which is fixed to a rotatable operating shaft 270 extending across the rear side of the pallet lift shaft. Shaft 270 is rotatably supported from the machine frame in journal assembly 274 and includes, at the opposite side of the lift shaft a similar crank and link connection 268a, 266a, 264a for controlling side closing in guide 206. A single reversible pneumatic rotor 272 is employed to rotate shaft 270 to simultaneously actuate both side closing in guides 204 and 206. Motor 272 is pivotally supported at one end on the machine frame at 275 and its piston 276 is pivotally connected to crank 278 which is fixed to shaft 270.

In FIG. 13, the side closing in guides are shown in full line in their retracted position. Actuation of motor 272 from the full line position of FIG. 13 drives crank 278 upwardly to rotate shaft 270 and draw links 266 and 266a toward the rear of the machine, thereby rotating links 258 and 260 toward the rear of the machine to move pusher plate 262 out to the phantom line position of FIG. 11, thereby compressing the cartons located upon the pallet. Side closing in guide motor 272 is connected to be actuated simultaneously with front and rear closing in guide motors 238 and 246.

*Empty Pallet Magazine*

The function of empty pallet magazine 36 is to supply empty pallets to the full pallet lift as needed. Pallet magazine 36 is provided with a pallet receiving shaft located at one side of and in alignment with the full pallet lift shaft. At one side of magazine 36, the machine frame is open as at 300 (see FIG. 1) to permit the introduction of a stack of pallets into the magazine.

Referring now to FIGS. 4 and 5, the stack of pallets P within the magazine is normally supported upon a plurality of support fingers 302. As best seen in FIG. 1, a pair of support fingers 302 are located on each of two opposed sides of the magazine shaft.

Each of support fingers 302 is fixed to a vertically disposed pivot pin 304 which is journaled into the machine frame for rotation about a vertical axis. Each pivot pin 304 is provided with a crank arm 306 which is fixed to and rotates with its associated pivot pin. Cranks 306 of each pair of pivot pins are connected by a coupling link 308 which transmits movement of one pivot pin to the other. One of pivot pins 304 on each side of the magazine is provided with a second crank 309 which is pivotally connected to the piston rod 310 of a reversible pneumatic motor 312. Motor 312 is pivotally supported upon the machine frame by a motor mount 314 and may be selectively actuated to position the support fingers 302 either in the full line position of FIG. 5 or in a retracted position wherein fingers 302 are rotated clear of the pallet magazine shaft into openings 316 (FIG. 4) provided in the machine frame. An individual motor 312 is provided for each pair of support fingers, the motor and linkage assembly for the right hand set of fingers in FIG. 5 has not been shown for the sake of clarity. The two fingers operating motors 312 are pneumatically connected for simultaneous actuation.

To transfer pallets singly from fingers 302 to transfer conveyer 32, an empty pallet lift or transfer device 318 is provided at the bottom of the pallet magazine shaft. Empty pallet lift 318 includes a pair of elongated pallet engaging members 320, a member 320 being provided on each two opposed sides of the pallet magazine immediately outside of the chains of transfer conveyer 32. Each pallet engaging member 320 is pivotally connected at each end to respective support links 322, 324 which are respectively pivotally coupled at their other ends to cranks 326, 328. Cranks 326 and 328 are respectively secured to control shafts 330, 332 which are respectively journaled for rotation on the machine frame in generally identical journal assemblies 334. Shafts 330 and 332 are also coupled to each other by a connecting link 336 which is pivotally connected at each end to cranks 338, 340 respectively fixed to shafts 330 and 332.

A reversible pneumatic motor 342 is pivotally mounted upon the machine frame as at 344 and its piston rod 346 is pivotally connected to a driving crank 348 fixed to shaft 332, (FIG. 1).

As shown in FIGS. 4 and 5, the empty pallet lift 318 is disposed in its lowermost position wherein the pallet engaging members 320 are located below the driving chains of transfer conveyer 32. Although the piston rod connection to drive crank 348 is obscured in FIG. 4, it is believed that this figure, with reference to FIG. 1, will most clearly show the operation of empty pallet lift 318. In FIG. 4, the piston of motor 342 is located at its rightwardmost limit of travel. Actuation of the motor 342 to move the piston to the left will, through crank 348, rotate shaft 332 in a counter-clockwise direction as viewed in FIG. 4. This rotation of shaft 332 is transmitted to shaft 330 through coupling link 336 and also through the pallet engaging members 320. As can be appreciated from FIG. 4, counter-clockwise rotation of shafts 330 and 332 rotates cranks 326 and 328 upwardly to elevate the pallet engaging members 320.

The upper limit of movement of pallet engaging members 320 is slightly above their dotted line position shown in FIG. 5. Pallet engaging members 320 move to an upper position wherein the lowermost pallet P of the stack within the pallet magazine is lifted slightly above and clear of support fingers 302. As the empty pallet lift approaches its upper position, a control circuit is actuated to retract support fingers 302 from the pallet supporting position shown in FIG. 5 into openings 316. As pallet engaging members 320 return downwardly toward the full line position in FIG. 5, support fingers 302 are actuated to return to their FIG. 5 position after the lowermost pallet of the stack has passed below the support fingers. Hence, the support fingers return to the shaft in time to engage the next to lowermost pallet in the stack and allow the lowermost pallet to continue downwardly with the empty pallet lift. As the pallet engaging members 320 are lowered below transfer conveyer 32, support of the empty pallet is transferred from the empty pallet lift to the chains of conveyer 32.

To coordinate the foregoing action, shaft 332 is extended outwardly through a limit switch supporting plate 350 mounted on one side of the machine frame. The extended end of shaft 332 is provided with a radially extending limit switch operating finger 352 which will engage, during the course of rotation of shaft 332, the strikers of various limit switches located upon support plate 350.

Three limit switches are shown, in FIG. 4, mounted upon support plate 350. Limit switch LS1 is employed to detect the arrival of empty pallet lift 318 at its extreme upward limit of movement. Limit switch LS2 is employed to detect the approach of the empty pallet lift to the upper limit and is located to actuate the control circuit to retract support fingers 302 as pallet engaging members 320 engage the lowermost pallet of the stack. Limit switch LS3 is located to be engaged during the lowering movement of empty pallet lift 318 to actuate the control circuit to return fingers 302 to their extended position in time to support the next to lowermost pallet in the stack.

A pallet stack depletion detector is located in the pallet magazine immediately above the leftwardmost support fingers in FIG. 5. The depletion detector includes a pivoted arm 354 which is spring biased toward the full line position of FIG. 5 by a suitable spring (not shown). A switch operating cam 356 is located upon arm 354 to operate the striker of limit switch LS5 which actuates appropriate control circuits when no extra pallet is disposed within the pallet magazine.

At the exit of the pallet magazine a pallet engaging arm 358 is pivotally supported above the chains of transfer conveyer 32 in a position to detect the arrival of a pallet at a "ready" position. Arm 358 is pivotally supported upon the machine frame within a housing 360 within which limit switch LS6 is disposed in a position to have its striker engaged by cam 362 upon the arrivel of a pallet at the "ready" position. Since the significance of the "ready" position relates essentially to the operation of the machine, discussion of this will be deferred to that portion of the specification.

*Transfer and Discharge Conveyers*

Transfer conveyer 32 and discharge conveyer 34 are in effect a single conveyer since they are simultaneously actuated and driven by a single conveyer drive motor 400 which is drivingly coupled to conveyer 34. Driving movement of conveyer 34 is transmitted to conveyer 32 through a chain and sprocket assembly 402 (FIG. 2).

Conveyer 32 includes a pair of spaced parallel chains 404 which extend through the lower portion of the pallet magazine shaft and into the lower portion of the full lift shaft. Empty pallets being transferred from empty pallet magazine 36 are supported upon the upper surface of chains 404 which ride on the upper surface of the frame members 406.

Discharge conveyer 34 likewise includes a pair of spaced parallel chains 408 which are, in effect, continuations of the chains 404 of the transfer conveyer. Since discharge conveyer 34 must handle the fully loaded pallets, a roller conveyer 410 section is included in discharge conveyer 34 and is located centrally between chains 408 in a position to supportingly engage the central frame member of the loaded pallet. The rollers of conveyer 410 are not driven, but merely provide a supporting surface for the loaded pallet. Motor 400 is connected to drive chains 408 through gear box 412 which is coupled through a chain and sprocket connection 414 to drive power shaft 416 to which are coupled the respective end sprockets 418 of conveyer 34.

To locate arriving empty pallets in position over the full pallet lift platform, an empty pallet stop shown in FIG. 14 420 is located at the discharge side of the full pallet lift. Stop 420 includes a shaft 422 journaled in the supporting frame members of discharge chains 408. Stop arms 424 are mounted on shaft 422 adjacent each of chains 408 while a limit switch actuating arm 425 is mounted on shaft 422 approximately midway between chains 408 in a position to be raised and lowered through an opening provided in the roller conveyer. Shaft 422 is rotated by a reversible pneumatic motor 426 which is pivotally supported upon the roller conveyer frame at 428. The piston rod 430 of motor 426 is pivotally connected to a crank arm 432 which is fixed to shaft 422. A limit switch operating cam 434 is fixed to shaft 422 and is located to operate the striker of a limit switch LS9 mounted upon the roller conveyer frame.

A slight amount of lost motion is provided in the coupling between crank 432 and arm 425 so that engagement of an entering empty pallet with arm 425 will rotate arm 425 in a counter-clockwise direction from the full line position of FIG. 14 to actuate limit switch LS9. Arms 424 and 425 are lowered by actuating motor 426 to move piston rod 430 to the left in FIG. 14, thus rotating shaft 422 in a clockwise direction.

Since both discharge section 34 and transfer section 32 of the conveyer drive simultaneously, an empty pallet enters the full pallet lift at the same time the loaded pallet is being discharged. Stop 420 obviously must be in its lowered position to permit the loaded pallet to leave the full pallet lift. To raise stop 420 in time to be engaged by the following empty pallet, limit switch LS7 is located adjacent the discharge end of the roller conveyer. Limit switch LS7 is actuated by engagement of the loaded pallet with a detecting roller 436 located one pallet length beyond stop 420. Detector roller 436 is mounted at the end of a pair of crank arms 438 which are pivoted for rotation about the axis of the next preceding roller and are normally biased to maintain roller 436 elevated slightly above the conveying surface of the roller conveyer. The depending portion of crank arms 438 are located to actuate the striker of LS7 when roller 436 is depressed by the loaded pallet being discharged from the lift.

*Control System and Operation*

A schematic diagram of the pneumatic system is shown in FIG. 15. Since each of the valves and motors of FIG. 15 are substantially similar, only one has been shown in detail, the remaining valves shown schematically being similar.

For purposes of illustration, the carton retaining guard operating motor 94 and its associated control valve have been enlarged. Motor 94 includes a closed cylinder 450 within which a piston 452 is mounted for reciprocation. The interior portions of cylinder 450 at either side of piston 452 are respectively connected through lines 454 and 456 to reversing valve 458. Valve 458 is also connected to a pressure line 460 through which pneumatic pressure is supplied to the valve and is provided with an exhaust port or vent 462. A sliding valve member 464 is mounted for movement within valve 458 and includes two sets of valve operating passageways. As shown in FIG. 15, valve member 464 is disposed at one limit of travel within the valve body, and in this position establishes a connection between pressure line 460 and motor line 456 to supply pressure to the right hand side of piston 452. Exhaust port 462 is, in this position of member 464, connected to line 454 to vent the chamber at the left hand side of piston 452. With this set of connections, piston 452 will be driven to its left hand limit of movement of FIG. 14. When valve member 464 is disposed at the opposite end of the valve body, the other set of operating passages will register with lines 454, 456, 460 and 462 to connect pressure line 460 to line 454 and connect line 456 to the exhaust port 462 to drive the piston to its opposite limit of movement. Member 464 is moved within the valve body by a pair of solenoids designated SO5D and SO5U. In the position shown in FIG. 14, solenoid coil SO5U is energized and has drawn member 464 to its FIG. 14 position. Valve 458 is constructed so that member 464 will maintain the FIG. 14 position after solenoid SO5U has been de-energized, member 464 remaining in the illustrated position until solenoid SO5D is energized to move member 464 to the opposite end of the valve body.

Energization of the various valve controlling solenoids is controlled by the various limit switches, the contacts of which are connected in the manner shown in the electrical diagram of FIG. 16. To assist in relating the various contacts to their respective limit switches, the contacts in the electrical schematic have been identified by the reference numeral of the limit switch followed by an appropriate subscript. It will be noted that certain of the contacts have been schematically illustrated by parallel lines, while others have been illustrated by a pair of parallel lines with a diagonal line drawn across them. The diagonal line is used to indicate those contacts which are normally closed, i.e., contacts which are closed when the associated limit switch striker is not engaged or hangs freely. Contacts shown merely by the spaced parallel lines are contacts which are closed only when the associated limit switch striker is engaged by its actuating part.

In addition to the limit switches, various interlocking contacts are associated with the electrical drive motors. Full pallet lift motor 112 appears on the electrical schematic as two "motors" designated D1U and D1D respectively corresponding to energization of full pallet lift motor 112 driving in its upward or raising direction and its downward or lowering direction. Both "motors" D1U and D1D have suitable control contacts associated with them, the contacts including a diagonal line such as D1Da being closed at all times when the associated motor, D1D in this example, is not energized. On the electrical schematic, motor D2 represents discharge chain drive motor 400 which, since it drives only in a single direction, appears as a single "motor" on the electrical schematic. "Motors" D3F and D3R represent apron drive motor 28, D3F representing the forward driving direction in which apron 50 is driven toward accumulation table 38, while D3R represents the retracting movement of the apron 50.

In addition to the various motors, safety interlocks in the form of relays R2 and R3, together with associated contacts, are provided while relay T1 is a time delay relay which remains energized for a predetermined period of time.

The function of the electrical circuit of FIG. 16 may be best appreciated by discussing it in terms of operation of the machine. As an initial condition, it will be assumed that the full pallet lift is located at its lower limit of travel, apron 50 is at its forward (FIG. 8) position, closing in guides 200, 202, 204 and 206 are retracted, carton retaining guard 80 is raised, an empty pallet is located in the "ready" position at the entrance to the full pallet lift, the empty pallet lift is at its lower limit of travel, and the empty pallet stop is raised.

At this time, the transfer chains will be energized through contacts LS10a, which are closed by the presence of the full pallet lift at its lower limit of travel. The empty pallet is driven by the conveyer from the "ready" position into the full pallet lift shaft and continues to move until it engages the empty pallet stop. Engagement of the empty pallet with the empty pallet stop acts to close contacts LS9a to energize the full pallet lift elevating "motor" D1U. The D1U energizing circuit is completed through contacts LS15a which are closed by the presence of the closing in guides in their retracted position, contacts LS13b which are closed at all times when the full pallet lift is not at its upper limit, and contacts D1Da which are closed at all times when "motor" D1D is not energized. Upon energization of "motor" D1U, contacts D1Ub are closed to by-pass contacts LS9a and lock in D1U.

As the full pallet lift starts up, it engages limit switch LS4, closing contacts LS4a to energize solenoid coil SO2U, through contacts D1Ua which were closed upon energization of "motor" D1U. Solenoid coil SO2U conditions the reversing valve associated with empty pallet lift motor 342 to elevate the empty pallet lift. As the empty pallet lift approaches the pallets attacked within the empty pallet magazine, limit switch LS2 is engaged to close contacts LS2a, thereby energizing solenoid coils SO10. Solenoid coils SO10 condition the support finger operating motors 312 to retract the support fingers clear of the empty pallet lift as the empty pallet lift engages the lowermost pallet in the stack. When the empty pallet lift arrives at its upper limit, limit switch LS1 is engaged to close contacts LS1a, thereby energizing solenoid coil SO2D through contacts LS5a which are closed by the presence of the pallets in the magazine shaft. Contacts LS4a are opened by this time, since the full pallet lift has passed above limit switch LS4. Solenoid SO2D reverses the connections to the empty pallet lift motor 342 and conditions the motor to lower the empty pallet lift. As the lowermost empty pallet moves below the support fingers, limit switch LS3 is engaged to close contacts LS3a, thereby energizing solenoid coils SO11. Solenoids SO11 reverse the connections to support finger operating motors 312 to drive support fingers 302 back into the empty pallet shaft in time to engage the next to lowermost pallet on the stack, while allowing the lowermost pallet to continue downwardly with the empty pallet lift. As the empty pallet lift lowers below transfer chains 404, the empty pallet becomes supported on the transfer chains and is driven toward the full pallet lift. When the empty pallet arrives at the "ready" position, it engages limit switch LS6 to open normally closed contacts LS6a to open the circuit to the transfer chain drive motor D2. Since the contacts LS10a have been opened by the departure of the full pallet lift from its lower limit, the transfer chains are halted by the arrival of the empty pallet in the "ready" position.

From the description this far, it can be seen that the normal, or unactuated condition, of the empty pallet magazine finds a pallet located in the "ready" position at the entrance to the full pallet lift while the remaining pallets are supported upon the support fingers. The cycle of actuation of the mechanism for extracting the lowermost pallet from the stack within the magazine occurs during upward movement of the full pallet lift and hence there is no critical time limit within which the extraction must be performed, as would be the case if the cycle were performed during the approach of the full pallet lift to its bottom limit. Further, the establishment of a ready position for the waiting empty pallet at a position which is effectively intermediate the empty pallet lift and full pallet lift may be employed to control, at least in part, the operation of the conveyer chains, thus dispensing with the necessity for maintaining the conveyer in operation at all times.

Returning now to the full pallet lift which is raising an empty pallet toward the upper limit of the lift movement, "motor" D1U remains energized until the lift reaches its upper limit, at which time limit switch LS13 is actuated to open contacts LS13b, thereby opening the circuit to "motor" D1U. De-energization of "motor" D1U opens contacts D1Ub, thus preventing subsequent energization of "motor" D1U upon subsequent closing of contacts LS13b, and closes contacts D1Ua. This action conditions "motor" D1D for subsequent actuation depending upon the contacts LS17a and LS18a, contacts LS10b being closed since the full lift is not at its bottom limit.

As stated in the general description of the machine, articles to be loaded upon the pallet are manually arranged into patterns and transferred manually by the machine operator to the apron. When the operator has transferred sufficient articles to apron 50 to form a layer upon the pallet, the operator actuates a push button PB to energize apron retraction "motor" D3R to retract the apron and strip the articles on to the waiting pallet. Closing of the contacts of push button PB completes a circuit across the power supply through contacts LS17b, which are closed since the apron is not at its limit of retraction, contacts R2b (safety interlock contacts to be described below) and contacts D3Fa which are closed since "motor" D3F is not energized at this time. Actuation of "motor" D3R closes contacts D3Ra to by-pass the push button PB contacts. Solenoid SO5D is connected across the line in parallel with "motor" D3R and is simultaneously energized to condition carton retainer motor 94 to lower the carton retainer to its operating position. Retraction of the apron from beneath the articles strips the articles, by their engagement with stripper bar 26, from the apron and allows them to drop on to the pallet supported immediately below the apron by the full pallet lift. Upon full retraction of the apron, limit switch LS17 is engaged to open contacts LS17b to de-energize "motor" D3R.

Simultaneous with the opening of contacts LS17b, contacts LS17a are closed. Retraction of the apron releases latch keeper arm 133 of full lift drop control 120 and allows arm 126 to drop down upon the upper surface of the articles upon the pallet, thereby rotating cam 138 to engage the striker of limit switch LS18 and close contacts LS18a. Closing of both contacts LS17a and LS18a energizes the full lift lowering "motor" D1D and the lift begins its downward movement. Arm 126 of the full lift drop control follows the articles as they are lowered by the lift. When the upper surface of the articles upon the lift reach the level previously occupied by the pallet surface, cam 138 is disengaged from the striker of limit switch LS18, thereby opening contacts LS18a to stop lowering of the lift.

Simultaneous with the opening of contact LS18a, contacts LS18b are closed to complete a circuit through "motor" D3F causing the apron to be driven back toward accumulation table 38. This driving circuit is completed through contacts LS18b, contacts LS16a which are closed whenever the apron is not at its forward limit of movement, and contacts D3Ra which were closed upon de-energization of "motor" D3R.

From the description of the mechanical features of the apron 50 and accumulation table 38, it will be recalled that while the apron is retracted stop bar 52 projects upwardly along the rear end of accumulation table 38. This permits the machine operator to assemble a row of articles while the apron is retracted and to transfer these articles to the accumulation table where they will be maintained in position by stop 52 pending return of the apron to its forward (FIG. 8) position.

Arrival of the full lift at the desired level causes actuation, by cam 140, of limit switch LS19 on full lift drop control 120. Engagement of limit switch LS19 by cam 140 closes contacts LS19a to energize timing relay T1 which in turn closes contacts T1a to energize relay R3. Upon energization of relay R3, contacts R3a are closed to complete a circuit through solenoid coils SO4aC, SO4bC and SO4cC. Energization of the three last mentioned solenoids conditions the respective closing in guide operating motors 238, 246 and 272 to drive the front, rear and side closing in guides to compact the layer of articles upon the pallet. After a predetermined time, timing relay T1 automatically opens, thereby de-energizing relay R3 to cause contacts R3b to close. Contacts R3b are in series with contacts LS15b which are now closed since the closing in guides are away from their retracted positions, and thereby completes a circuit through solenoid coils SO4aO, SO4bO and SO4cO which reverse the connection to the various closing in guide operating motors to drive the guards toward their retracted position until limit switch LS15 is contacted to open contacts LS15b.

It should be noted that control of the full pallet lift in either direction of movement requires contacts LS15a to be closed. Contacts LS15a are closed only when the closing in guides are in their retracted position clear of the full pallet lift shaft, thereby preventing movement of the full pallet lift at any time the closing in guides are projected into the shaft. Carton retaining guard 80 is raised upon energization of apron "motor" D3F which closes contacts D3Fb to energize solenoid coil SO5U which establishes the approximate pneumatic connection to motor 94 to raise guard 80.

The foregoing cycle of apron operation and step by step lowering of the full pallet lift continues until a full load is disposed upon the pallet within the lift. At this time, the last lowering movement of the lift causes the lift to contact limit switch LS14 and close contacts LS14a. Contacts LS14a, when closed, by-pass LS17a and LS18a through contacts LS7b which are open only when a loaded pallet is in contact with the pallet detection roller at the discharge end of the discharge conveyer section.

Continuous lowering of the lift, as by movement initiated by the presence of a full load on the pallet, or at the election of the operator at any time prior to the location of a full load upon the pallet, is controlled through a safety relay R2.

Relay R2 is a safety interlock and is provided to prevent inadvertent full lowering of the lift during the step by step lowering cycles between the upper limit and the fully loaded position. Relay R2 is initially energized by the arrival of the full pallet lift at its upper position, at which time the contacts LS13a are closed. The energizing circuit through relay R2 is completed through contacts LS13a, contacts LS14b, which are open only when the full pallet lift is at the loaded level intermediate the upper and lower positions, and a manually controlled push button switch PBD. Initial energization of relay R2 closes contacts R2a which by-pass LS13a to maintain the relay energized when the full lift is lowered away from its upper limit switch LS13. The full lift drop switch PBD is normally maintained in the position wherein contacts PBDa are closed and contacts PBDd are open. When the lift is lowered to its loaded level, contacts LS14b are opened to open the energizing circuit to relay R2. Upon opening of the circuit to relay R2, contacts R2c are closed, thereby providing a permanent by-pass around contacts LS17a and LS18a through contacts D1Db which are closed whenever "motor" D1D is energized, thereby conditioning the lift for continuous lowering.

Closing of the contacts LS14a by the arrival of the full pallet lift at its loaded level initially establishes the foregoing condition until relay R2 is de-energized by the arrival of the lift at the loaded level.

If, for any reason, the operator desires to discharge a pallet when it is only partially loaded, a similar action may be initiated by depressing push button switch PBD to open contacts PBDa in the circuit to relay R2 and simultaneously by-passing contacts LS14a by contacts PBDb.

It will be noted that the presence of the contacts R2b in the apron retraction circuit prevent retraction of the apron prior to the energization of relay R2 since contacts R2b are opened whenever relay R2 is not energized.

Lowering of the full pallet lift closes contacts D1Dc to energize solenoid coil SO3D. Solenoid SO3 controls the empty pallet stop 420, SO3D conditioning the empty pallet stop operating motor 426 to lower the stop. As the full pallet lift approaches its lowermost position, the loaded pallet is transferred from the full pallet lift to the conveying chains. Arrival of the full pallet lift at its lower limit engages limit switch LS10 to close contacts LS10a and energize the transfer chain driving motor D2 to discharge the loaded pallet from the full pallet lift shaft and simultaneously transfer the empty pallet located in the ready position into the full pallet lift shaft. As the loaded pallet clears the full pallet lift shaft, its leading edge engages pallet detection roller 436, actuating limit switch LS7 to close contacts LS7a, thereby energizing solenoid SO3U to raise the empty pallet stop in time to intercept the following empty pallet. Solenoid coil SO3D is de-energized at this time, since the arrival of the full pallet lift at its lower limit de-energizes the full pallet lift lowering "motor" D1D by opening contacts LS10b.

When the empty pallet engages the empty pallet stop, limit switch contacts LS9a are closed, thereby conditioning the control circuit to repeat the foregoing cycle under the control of the machine operator.

While I have described but one embodiment of my invention, it will be apparent to those skilled in the art that the disclosed embodiment is capable of modification. Therefore, the foregoing description is to be considered exemplary rather than limiting and the true scope of my invention is that defined in the following claims:

The embodiments of the invention in which an exclusive property or privilege is claimed and defined as follows:

1. A pallet loading machine comprising a pallet lift, means for raising and lowering said lift, a magazine for supplying pallets to said pallet lift, a conveyor for conveying pallets from said magazine to said lift, driving means for said conveyer, means responsive to the arrival of said pallet lift at its lowered position for energizing said driving means to drive a first pallet from a ready position on said conveyer between said magazine and said lift into position on said lift, means responsive to movement of said pallet lift away from said lowermost position for extracting a second pallet from said magazine and placing said second pallet upon said conveyer, and means responsive to the arrival of said second pallet at said ready position on said conveyor for de-energizing said driving means.

2. A pallet loading machine comprising a pallet lift, means for raising and lowering said pallet lift between an upper and a lower limit, means for loading articles upon a pallet located on said lift, a magazine for supplying empty pallets to said pallet lift, a conveyor extending from said magazine through said pallet lift at a level above said lower limit to a discharge station clear of said pallet lift, means for driving said conveyor to move pallets located thereon in a direction toward said discharge station, means responsive to the arrival of said pallet lift at said lower limit for energizing said driving means to convey a loaded pallet from said lift to said discharge station and to simultaneously convey a first empty pallet from a ready position on said conveyor between said magazine and said lift into said lift, means responsive to the arrival of said first empty pallet in said lift for raising said lift with said first empty pallet supported thereon, means responsive to upward movement of said lift for transferring a second empty pallet from said magazine on to said conveyor, means operable in the absence of a third empty pallet in said magazine for rendering said means responsive to upward movement of said lift ineffective, and means responsive to the arrival of said second empty pallet at said ready position for de-energizing said conveyor driving means.

3. A pallet loading machine comprising a pallet lift, means for raising and lowering said pallet lift between an upper and a lower limit, a conveyor extending through said pallet lift at a level above said lower limit from a ready position at one side of said pallet lift to a discharge station clear of the other side of said pallet lift, energizable means for driving said conveyor to move pallets located thereon in a direction from said ready position toward said discharge station, a retractable pallet stop on said conveyor at said other side of said pallet lift operable in its normal position to stop a pallet on said conveyor at a location in vertical alignment with said pallet lift, means operable upon movement of said pallet lift toward said lower limit for retracting said pallet stop to render said stop ineffective, means operable upon the arrival of said lift at said lower position for energizing said conveyor driving means to discharge a first pallet from said lift to said discharge station and to simultaneously transfer a second pallet from said ready position into said lift shaft, means operable by the arrival of said first pallet at a predetermined point clear of said pallet lift for moving said pallet stop to its normal position, means operable by the engagement of said second pallet with said stop for causing said raising and lowering means to raise said lift from said lower limit, means responsive to upward movement of said pallet lift for locating a third pallet at said ready position, and means engagable by said third pallet when in said ready position for de-energizing said conveyor driving means.

4. A pallet loading machine comprising a pallet lift, an article assembly station located at one side of the upper end of said lift, a retractable apron having an article supporting surface for transferring articles from said assembly station to a pallet located on said lift, means supporting said apron for movement between a normal position wherein said apron is disposed adjacent said article assembly station with said article supporting surface overlying said lift and inclined downwardly from said assembly station and a retracted position wherein said apron is located beyond the side of said lift opposite said assembly station with said article supporting surface in a substantially horizontal position, said supporting means being operable to shift said supporting surface into a horizontal position during the initial portion of movement of said apron away from said normal position, power means on said apron and movable therewith for driving said apron between said normal and said retracted positions, and mean extending across said opposite side of said lift above said apron for stripping articles from said apron during movement of said apron toward said retracted position.

5. A pallet loading machine comprising a pallet lift, an article assembly station located at one side of the upper end of said lift, a retractable apron having an article supporting surface for transferring articles from said assembly station to a pallet located on said lift, means supporting said apron for movement between a normal position wherein said apron is disposed adjacent said article assembly station with said article supporting surface overlying said lift and inclined downwardly from said assembly station and a retracted position wherein said apron is located beyond the side of said lift opposite said assembly station with said article supporting surface in a substantially horizontal position, said supporting means being operable to shift said supporting surface into a horizontal position during the initial portion of movement of said apron away from said normal position, power means on said apron and movable therewith energizable to drive said apron between said normal and said retracted positions, manually controlled means for energizing said apron drive means to drive said apron from said normal position to said retracted position, means overlying said opposite side of said lift above said apron for transferring articles on said apron from said apron to said lift during movement of said apron toward said retracted position, and means controlled by said pallet lift for energizing said apron drive means to drive said apron from said retracted position to said normal position.

6. A pallet loading machine comprising a pallet lift, an article assembly station located at the upper end of said lift, a retractable apron having an article supporting surface supported for movement between a normal position adjacent said article assembly station with said article supporting surface overlying said lift and inclined downwardly from said article assembly station and a retracted position wherein said article supporting surface is supported in a substantially horizontal position beyond one side of said lift, a stripper bar extending across said apron at the side of said lift to which said apron retracts to strip articles from said apron to said lift during movement of said apron toward said retracted position, and means located adjacent said article assembly station for engaging articles on said apron adjacent said station to maintain the articles in upright condition during the initial portions of movement of said apron toward said retracted position.

7. An apron assembly for a pallet loading machine having a frame defining a lift shaft, said assembly comprising a pair of spaced parallel tracks on said frame extending along opposite sides of said shaft at the upper end thereof, an apron having spaced front and rear edges extending transversely between said tracks, roller means on each of said front and rear edges supporting said apron upon said tracks for movement between a first position adjacent one end of said tracks wherein said apron overlies said shaft and a second position adjacent the other end of said tracks wherein said apron is withdrawn from said shaft, each of said tracks having a horizontal section and an inclined section, said inclined section being inclined downwardly from said one end of said tracks to join said horizontal section at a point between said one end of said tracks and the point of engagement of the roller means on the rear edge of said apron with said tracks when said apron is in said first position whereby the front edge of said apron is elevated above the rear edge when said apron is in said first position, and motor means mounted upon said apron at the rear edge thereof for driving said apron between said first and said second position.

8. Article handling apparatus comprising a frame, an article accumulation table having a front and a rear edge and an article supporting surface extending therebetween, means supporting said table upon said frame for pivotal movement about a horizontal axis extending along said front edge of said table, an apron having a front edge and an article supporting surface, means mounting said apron upon said frame for movement between a normal position wherein the front edge of said apron is located adjacent the rear edge of said table and a retracted position wherein the front edge of said apron is spaced from the rear edge of said table, a stop bar at the rear edge of said table, means on said frame engageable with said table for supporting said rear edge thereof in a first position wherein the article supporting surface of said table is disposed below said stop bar and is inclined downwardly from said front edge to said rear edge, and means operable when said apron is moved into said normal position to elevate said rear edge of said table from said first position pivoting said table upwardly about said axis and to support said rear edge of said table at a second position wherein the article supporting surfaces of said table and said apron are in alignment and disposed above said stop bar.

9. A pallet loading machine comprising an article assembly station for assembling articles into rows, an apron having a forward edge movable toward and away from a rest position spaced from one side of said assembly station, an accumulation table extending downwardly from said one side of said station to said forward edge of said apron when said apron is in said rest position, means supporting said table for pivotal movement about an axis extending along said one side of said station, stationary means for supporting said table in a first position wherein said table is inclined downwardly from said station, a stop located on said stationary means and projecting upwardly beyond said table when in said first position to prevent articles from moving beyond said table, and means on said apron engagable with said table when said apron is in said rest position for supporting said table in a second position wherein said table is located above said stop to permit articles to pass from said table to said apron.

10. In a pallet loading machine having a pallet lift, means for raising and lowering said lift between an upper and a lower limit, and a magazine for supporting a stack of empty pallets adjacent said lift; means for transferring pallets from said stack to said lift comprising a conveyer extending from a first location below said magazine to a second location above said lift when said lift is at said lower limit, first means actuable in response to upward movement of said lift from said lower limit for removing a first empty pallet from said stack and transferring said first pallet along said conveyor to a location intermediate said first and said second locations, second means actuable in response to downward movement of said lift to said lower limit for transferring said first pallet from said intermediate location to said second location, and third means responsive to the arrival of said first pallet at said second location for actuating said raising and lowering means to move said lift upwardly from said lower limit with said first pallet supported thereon to thereby actuate said first means to remove a second pallet from said stack and transfer said second pallet to said intermediate location.

11. A pallet loading machine as defined in claim 10 wherein said conveyor includes drive means operable when energized to drive said conveyor in a direction to convey pallets from said first location toward said second location, means operable upon actuation of said second means for energizing said conveyor drive means and means operable upon the arrival of a pallet at said intermediate location for de-energizing said conveyor drive means.

12. A pallet loading machine comprising a frame defining a lift shaft, means for raising and lowering said lift within said shaft, an accumulation table mounted on said frame at one side of the upper end of said shaft, infeed conveyer means for feeding articles in line to a location adjacent said table, transfer means for moving articles transversely across said conveyer onto said table to assemble a row of articles upon said table extending along said one side of said lift shaft at a location clear of said lift shaft and clear of the path of movement of articles along said infeed conveyer means, conveying means including an apron moveable across the upper end of said lift shaft for conveying a row of articles from said table across said lift shaft to a location above said lift, and means for withdrawing said apron from beneath said row of articles to thereby deposit said row of articles upon said lift.

13. In a pallet loading machine having a frame defining a lift shaft, a pallet lift, means for raising and lowering said lift within said lift shaft, an infeed conveyer for feeding articles in line to a location adjacent the upper end of said lift shaft, and means for transferring articles from said conveyer to said lift to assemble a layer of articles consisting of a plurality of rows of articles in side-by-side relationship on said lift; the improvement wherein said means for transferring articles from said conveyer to said lift comprises an article accumulation table located to support a row of articles adjacent one side of the upper end of said lift shaft between said shaft and said conveyer, transfer means for shifting articles transversely of their direction of movement on said conveyer onto said table to form a row of articles on said table extending along one side of said shaft, an apron mounted upon said frame for movement across the upper end of said lift shaft between a first position wherein said apron is located to receive a row of articles from said table and a second position wherein said apron is withdrawn from article receiving relationship with said table, means for driving said apron in forward and return movement from said first position to said second position to said first position, and stripping means operable during movement of said apron to engage articles on said apron and maintain the engaged articles against movement to thereby cause said apron to be withdrawn from beneath the articles to deposit the articles upon said lift.

14. In a pallet loading machine as defined in claim 13, the improvement comprising means cooperatively supporting said accumulation table and said apron upon said frame in a position wherein said table and said apron define a continuous article supporting surface inclined downwardly from said conveyer when said apron is in said first position whereby a row of articles transferred from said conveyer to said table is gravitationally urged toward the side of said apron remote from said table, the means supporting said apron including an inclined track section for shifting said apron into a horizontal position during the initial portion of movement of said apron away from said first position.

15. In a pallet loading machine comprising a frame defining a pallet shaft a pallet lift, means for raising and lowering said lift within the shaft, infeed conveyer means for conveying articles in line to an assembly table spaced from the upper end of said lift, and means for transferring articles from said table to said lift; the improvement wherein the transferring means comprises an apron conveyer assembly located at the upper end of said lift shaft, means for shifting a row of articles from said infeed conveyer means to a ready position on said apron assembly between said infeed conveyer means and said lift shaft, said conveyer assembly including an apron movable across the upper end of said lift shaft between a retracted position withdrawn from said lift shaft and an extended position overlying said lift shaft, said apron assembly being operable upon movement of said apron to said extended position to convey a row of articles from said ready position across the upper end of said lift shaft to a position overlying said lift, stripper means operable upon movement of said apron to said retracted position to strip articles from said apron to deposit said articles upon said lift, means responsive to the arrival of said apron at said retracted position for lowering said lift to lower the deposited articles thereon to a location below the position occupied by said apron when in said extended position, said apron assembly being operable during lowering movement of said lift to support a row of articles at said ready position, and means responsive to the arrival of deposited articles at a location below the extended position of said apron for stopping lowering movement of said lift and returning said apron to said extended position to convey the last mentioned row of articles across the upper end of said shaft.

References Cited in the file of this patent

UNITED STATES PATENTS

| | | |
|---|---|---|
| 930,365 | Engesser | Aug. 10, 1909 |
| 1,886,295 | Morris | Nov. 1, 1932 |
| 2,609,779 | Goldsworthy | Sept. 9, 1952 |
| 2,633,251 | Bruce | Mar. 31, 1953 |
| 2,707,567 | Bisset et al. | May 3, 1955 |
| 2,796,179 | Van Vleck | June 18, 1957 |
| 2,818,156 | Edwards | Dec. 31, 1957 |
| 2,875,907 | Locke et al. | Mar. 3, 1959 |
| 2,883,074 | Boehl et al. | Apr. 21, 1959 |

FOREIGN PATENTS

| | | |
|---|---|---|
| 781,736 | Great Britain | Aug. 21, 1957 |